United States Patent

[11] 3,591,930

| [72] | Inventors | James A. Little;<br>Henry H. Bruce, 1060 Cerrillos Road, both of Santa Fe, N. Mex. |
|---|---|---|
| [21] | Appl. No. | 775,751 |
| [22] | Filed | Nov. 14, 1968 |
| [45] | Patented | July 13, 1971 |

[54] INSTRUCTIONAL APPARATUS
3 Claims, 5 Drawing Figs.

[52] U.S. Cl. ..................................... 35/9 R, 35/48 R
[51] Int. Cl. ..................................... G09b 7/06
[50] Field of Search ......................... 35/8, 9, 48

[56] References Cited
UNITED STATES PATENTS

| 1,929,872 | 10/1933 | Lavery et al. | 35/48 |
| 2,496,767 | 2/1950 | Zuercher | 35/9 |
| 2,877,568 | 3/1959 | Besnard et al. | 35/9 |
| 2,983,054 | 5/1961 | Twyford | 35/9 |
| 3,332,157 | 7/1967 | Kirkconnell et al. | 35/48 |

Primary Examiner—Wm. H. Grieb
Attorney—Anderson, Luedeka, Fitch, Even & Tabin

ABSTRACT: An automatic, electrically controlled teaching machine may be easily programmed by an instructor who may write problems on program cards and secure the latter to a program drum. The teaching machine may be provided with means for operating the same in either a teaching or testing mode. In the teaching mode, the student progresses from one question to the next question only in response to a correct answer choice. In the testing mode, the student progresses from question to question in response to any answer choice, right or wrong, and the test is automatically graded.

PATENTED JUL 13 1971

INVENTORS
JAMES A. LITTLE
HENRY H. BRUCE

Anderson, Luedeka, Fitch, Even, & Tabin
ATTYS.

INVENTORS
JAMES A. LITTLE
HENRY H. BRUCE

ATTYS.

INSTRUCTIONAL APPARATUS

This invention relates to an instructional apparatus used for teaching or testing students and, more particularly, to a teaching machine of the automatic, electrically controlled and motor driven kind.

The effectiveness of teaching machines has been demonstrated. One form of electrically controlled and motor driven teaching machine displays questions or problems, and the student operates an appropriate selector switch, such as a pushbutton, to select an answer thought to be the correct answer from a series of multiple choice answers. Learning of correct answers to the problems is reinforced by suitable indication such as the flashing of a "correct" signal light and the appearance of the next problem of a series of problems that constitute a program. A suitable counter may be employed to score the students correct or wrong choices. Usually the teaching machine is furnished with a printed program of problems, and the machine is controlled by electrical or mechanical controls, such as, for instance, a perforated belt or sheet, so that the machine functions properly in response to right or wrong answer choices for each problem.

Preestablished programs are suitable for many occasions and for many students, but preestablished programs are inherently inflexible in failing to provide individual or specialized programs an instructor may desire for some of his students or for some esoteric subject matter. Often, the preestablished program is made with the questions and answers displayed on extremely long rolls, webs or belts which are difficult for the instructor to type on, write on or otherwise pose his questions. Even if the instructor is able to draft his own set of problems and answers, the electrical controls for the teaching machine may not be capable of being changed and thus necessitate that the instructor structure the answers always in the same answer location and in the same pattern if there is to be correct operation of the machine. To change the prior art machine controls to conform the teacher's program may be relatively impossible for the ordinary teacher or, if possible, so time-consuming and burdensome that the teacher usually will not attempt to change the controls.

Another shortcoming of conventionally known teaching machines from the standpoint of a classroom teacher, is that the automatic, electrically controlled and motor driven teaching machines are too expensive to be purchased in quantities needed in a classroom, particularly when the cost of programs and auxiliary equipment are included. Thus, a definite need exists for a highly flexible and low cost teaching machine of the automatic kind.

Accordingly, an object of the invention is to provide an electrically operated teaching machine which may be programmed easily and directly by an instructor.

Another object of the invention is to provide an apparatus suitable for both testing and teaching students.

A further object of the invention is to provide a low cost, highly flexible, easily programmed automatic teaching machine.

Other objects and advantages of the invention will become apparent from the following description taken in connection with the accompanying drawings in which.

Figure 1:
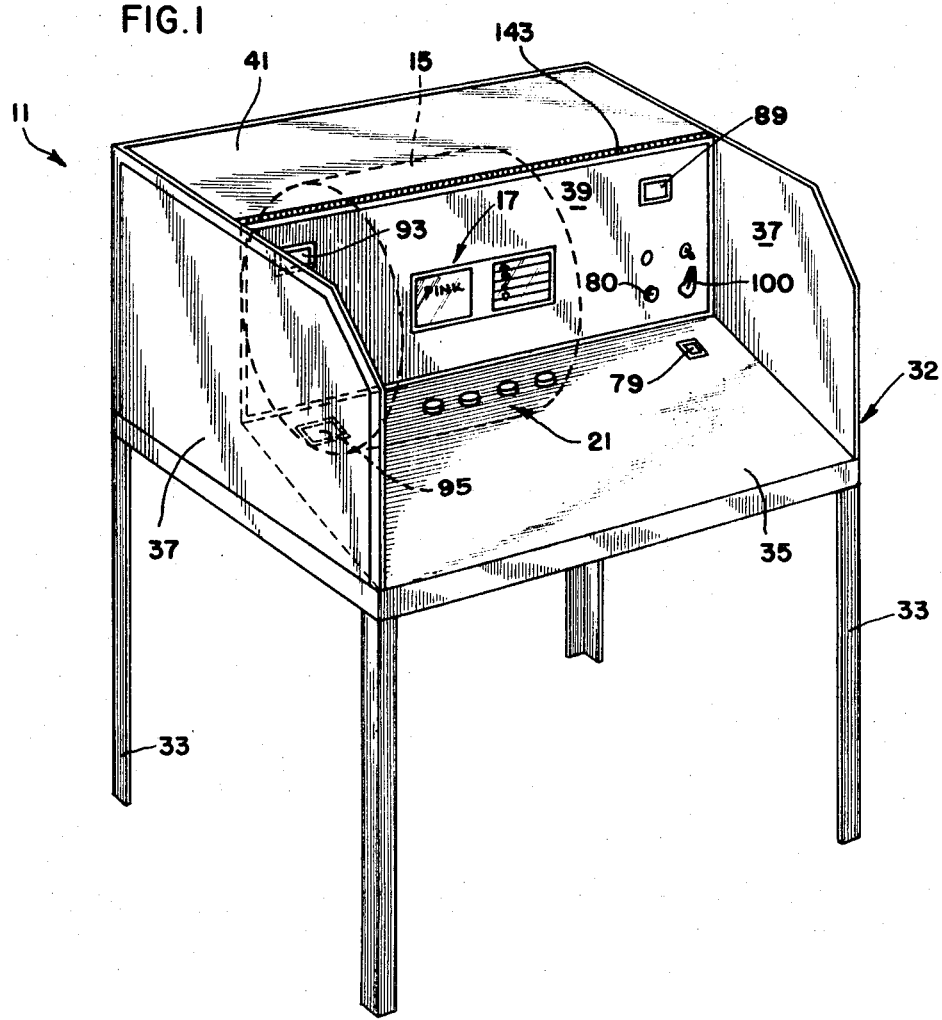
FIG. 1 is a perspective view of a teaching machine constructed in accordance with the preferred embodiment of the invention.
Figure 2:
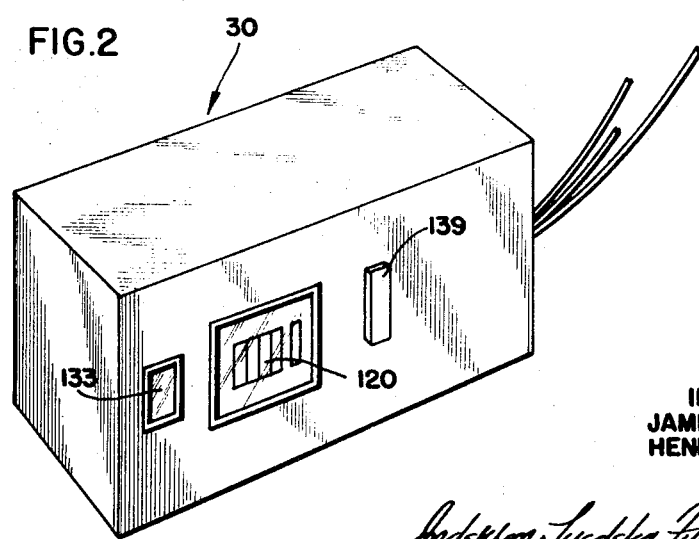
FIG. 2 is a teacher control unit which is optional and for use with the teaching machine of FIG. 1.

As shown in the drawings for purposes of illustration, the invention is embodied in an instructional apparatus including a teaching machine 11 for instructing a student in a given subject matter which is programmed on a series of program cards 13 (FIG. 3) mounted on the periphery of a rotatable program drum 15 which is suitably driven to step each of the problems on the program cards into an answering or display position in which the question may be viewed by the student at display opening or window 17 (FIG. 1). The program cards 13 are readily attached to or detached from the drum so that the instructor may use either his own program cards or use a set of purchased program cards. Sets of blank cards 13 are made available to the instructor who may write his problem in a space 19 (FIG. 3) on the card and place a series of multiple-choice answers within spaces in adjacent lines A, B, C and D. The student views the problem and the multiple-choice answers on display at the opening 17 (FIG. 1) and operates a selector means, such as pushbutton switches 21 designated A, B, C and D, to indicate his choice which he believes is the correct answer. The drum 15 steps automatically to the next problem if the student chooses correctly. If the student does not choose correctly, the drum 15 remains stationary and the student must make another answer choice. A "wrong" light flashes or some other indication is given to the student that he has selected the wrong answer. The student must continue to choose an answer and depress the pushbuttons until he depresses the one associated with the correct answer, for only then will the drum 15 index to the next question.

The instructor may make his program cards with the correct answers in the same positions and sequence as established for a printed and purchased program of cards. On the other hand, the instructor may make his program with the correct answers located in a patterned or a random sequence, and then set the electrical controls to correspond to his program. The setting of the electrical controls involves merely the placing of an addressor 23 carried on an end 25 of the drum to a radial position corresponding to the correct answer for its associated problem. The addressors are in the form of pins each insertable into one of four sockets 28 spaced radially on the drum end 25. The sockets are either color coded or coded with appropriate letters A, B, C and D to indicate which socket is associated with which of the answers. The addressors 23 operate appropriate switches in the control circuit for the machine, as will be explained in detail.

When the teacher desires to test the student's knowledge of a given subject matter and obtain an automatically scored test result, the teaching machine 11 is interconnected with a test control unit 30 which may be placed on the teacher's desk or mounted internally in the main console. When the test control unit is connected for testing, each time the student operates one of the push buttons 21 associated with an answer, the program drum 15 automatically indexes to the next question and if the answer selected is incorrect it operates wrong score counters 95 and 120 to visually display the number of wrong answers to the teacher and student as the test progresses. The testing mode differs primarily from the teaching mode in that in the testing mode the program drum 15 steps in response to operation of a pushbutton 21 associated with a wrong answer. It is in the teaching mode of operation that the student must make repetitive choices to learn the right answer.

Referring now in greater detail to the illustrated apparatus, the teaching machine 11 may be housed in various kinds of housings or cabinets and is, in this instance, housed within a cabinet of a console 32 having legs 33 supporting a worktable or surface 35 which is slightly inclined to the horizontal. Extending upwardly from the opposite sides of the worktable 35 are a pair of side panels 37 which shield the user against observation by other students or distractions.

The program drum 15 is housed at the rear of the console behind a front, almost vertical panel 39 which is hinged to a top panel 41 extending toward the rear and generally horizontally to a vertically disposed, rear panel. To provide rapid access to the program cards 13 on the drum 15 and to the electrical apparatus disposed in the housing, the top panel 41 is provided with a long piano hinge 43 which permits swinging of the front panel 39 upward about a horizontal axis through the hinge. A lock (not shown) may secure the panel 39 against unauthorized opening by the student. The display window 17 for the program problems and answers is disposed generally centrally of the front panel 39 and is flanked on the left and right by upper small windows for observation of a "wrong" or a "right" signal light. The selector pushbuttons 21 are disposed on the table 35 in front on the display window and are flanked by windows for a counter and a pilot light.

With the front panel 39 pivoted upwardly to expose the drum 15, the program cards 13 may be quickly and easily detached from the peripheral surface of the drum and replacement program cards 13 may be substituted therefor. Preferably, the program cards 13 are secured to the drum surface by releasable fastening means in the form of clips or slides 45 which are fastened to the surface of the drum and define channels into which the program cards may slide, from right to left as viewed in FIG. 3. A suitable stop or guide in the form of a clip 47 limits the insertion of the program card 13 at a position in which the cards are aligned for display at the display window 17.

Figure 4:
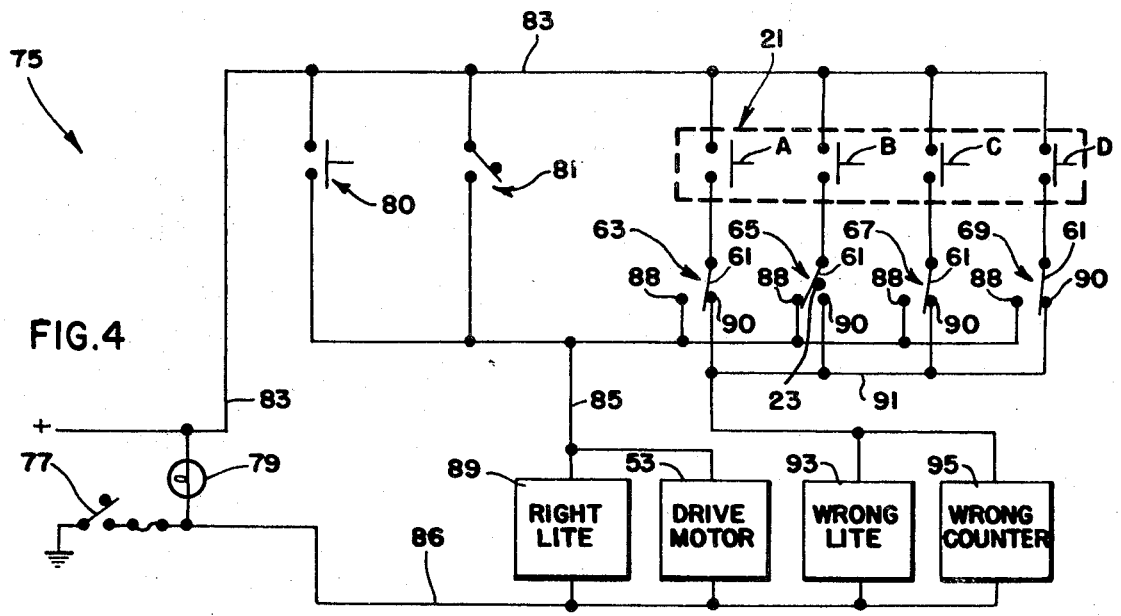
FIG. 4 is a schematic, electrical diagram for operation of the teaching machine of FIG. 1.
Figure 5:
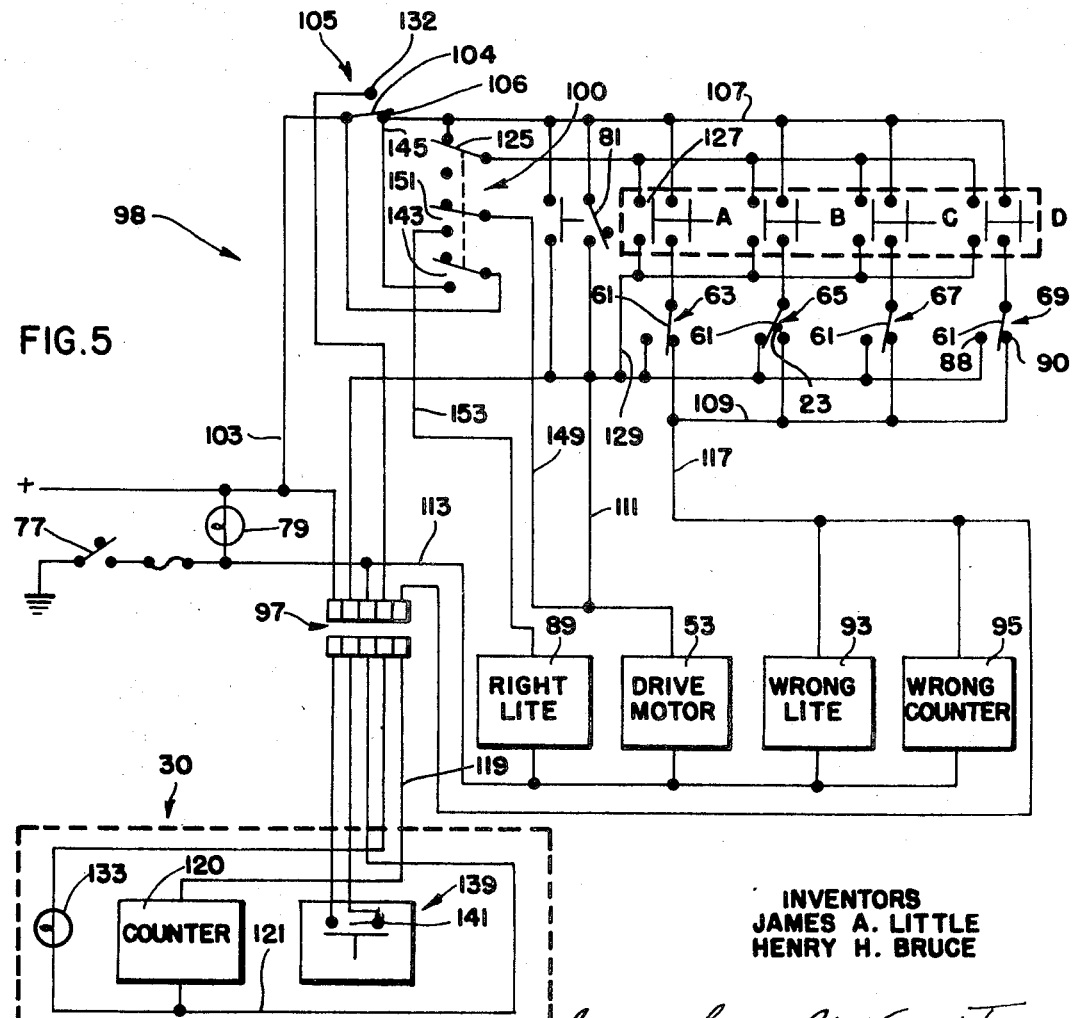
FIG. 5 is a schematic electrical diagram of a circuit used when the teaching machine of FIG. 1 is adapted for connection with the teacher control unit of FIG. 2.

The drum 15 is a right circular cylinder mounted for rotation about its longitudinal axis which is disposed in a generally horizontal plane. Fastened to and projecting outwardly from the opposite end walls 25 of the drum 15 are stub shafts 49 which are journaled for rotation in a suitable support such as a pair of upstanding brackets 51 of channel-shaped cross section. The brackets are fastened at their lower ends to the chassis of the console so as to provide a rigid support for the drum and accurately locate the program cards 13 relative to the display opening 17 in the front panel 39. A motor drive means including a motor 53 is suitably connected to the program drum 15 to index it through a predetermined arc when operated by a control circuit such as shown in FIG. 4 or 5. Preferably, the motor 53 is a commercially available form of gear motor which turns through a predetermined increment each time an appropriate switch closure is made. The increment is set by contacts 5 on the end of the drum 25 and switch 81. The contacts 5 are arranged in a circular array and are spaced angularly from each other at positions corresponding to each problem location and are aligned to actuate the switch 81 to open the circuit energizing the motor 53 whereby the motor stops turning the drum. On the other hand, the motor 53 may be a stepping motor which turns through a predetermined arc each time it is energized. As another alternative, the motor 53 may index the drum through a clutch mechanism, a pawl and ratchet mechanism or other kind of mechanism to cause a stepping of the drum through its various increments.

The number of program cards 13 and questions on the drum surface may be varied, and many teachers prefer a program of 20 or 25 questions so that each wrong question may be easily calculated to be worth five or four points, respectively The present invention, however, is not limited to any particular kind or number of program cards, problems or answers on the drum.

Of particular importance to the present invention is the capability of an instructor or some other person to readily understand and set the electrical controls for the machine in accordance with the correct answers on the cards 13. For example, if the instructor prepares his own program and does not wish to be limited to a previously arranged answer sequence, the instructor will, after placing the cards 13 on the drum, place each addressor 23 in the socket 28 corresponding to the correctly designated answer for each question. To assure that the instructor understands which row of sockets 55 is associated with a given problem and answer, it is preferred to provide lead lines 57 extending between the answers to a given row of sockets 55. The preferred addressors 23 are in the form of pins, commonly called jacks, which are generally cylindrical in shape and have one end which has a sliding friction fit with the interior wall of the socket. The addressor 23 will remain in a given socket until removed by a manual force exerted parallel to the direction of the axis of rotation of the drum. The outer ends of the addressors 23 extend outwardly of the drum end wall 25 to actuate switches, as will be explained.

The outer sockets in each of the radially extending row of sockets are disposed equidistantly from the rotational axis of the drum so that whenever an addressor 23 is in a radially outer socket, it will engage and actuate a leaf spring, contact swinger 61 of a control switch 63. Three other control switches 65, 67 and 69 are disposed adjacent the switch 63 and are mounted in a bracket arm 71 extending generally horizontally from the upper end of the mounting bracket 51 for the drum. Each of the leaf spring, contact swingers 61 for these other three switches 65, 67 and 69 is aligned with one of the other circular arrays of sockets 28 and all the sockets are spaced radially from the axis of the drum. Therefore, when an addressor 23 in one of the B, C or D sockets revolves into a switching position, it will actuate its respective contact swinger 61.

Figure 3:
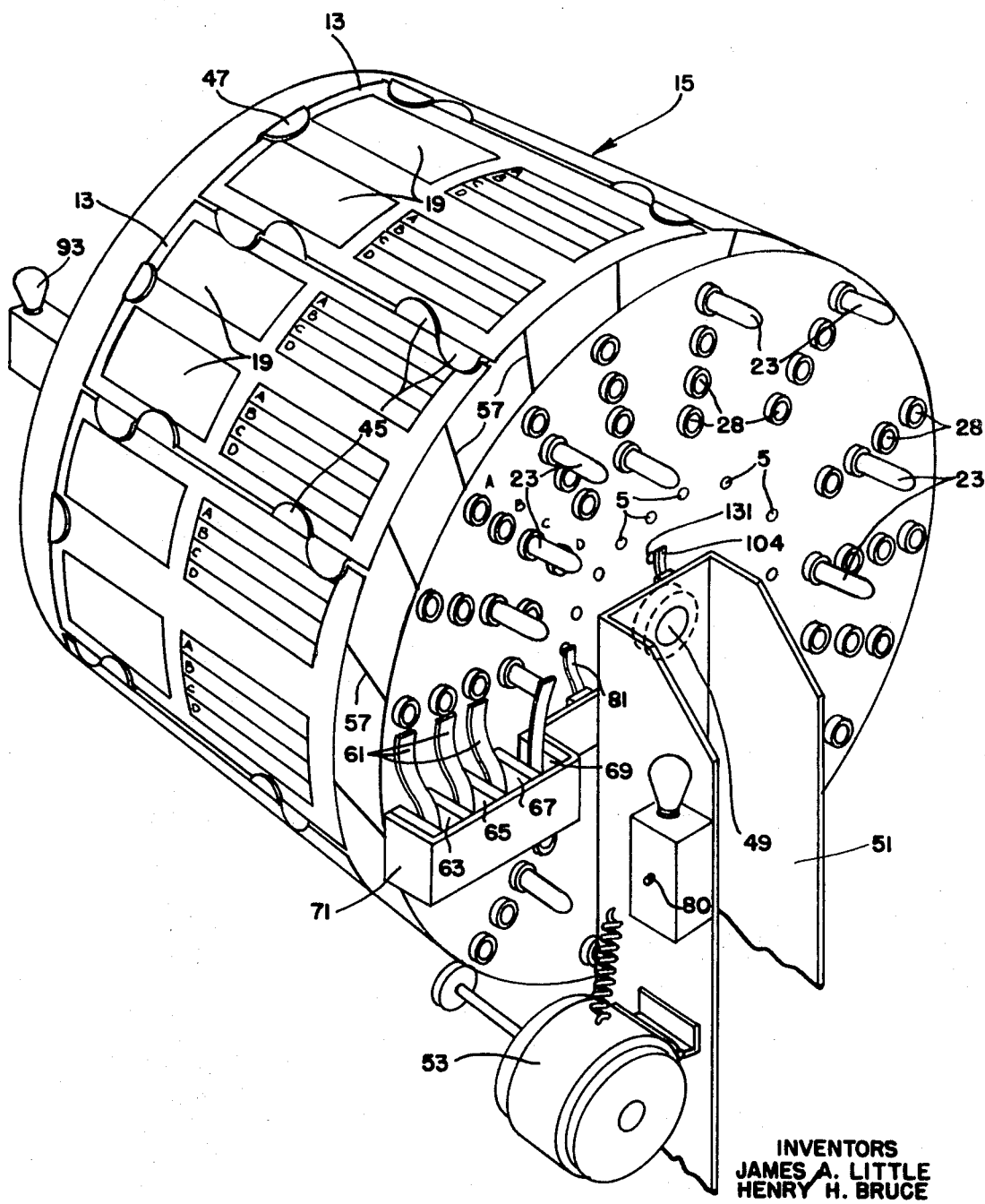
FIG. 3 is an enlarged, fragmentary perspective view of a rotatable program drum having a plurality of program cards thereon.

In this instance, the program drum 15 rotates upwardly and clockwise, as viewed in FIG. 3, to bring the addressor 23 upwardly to engage the underside of the contact swinger 61 which carries make and break contacts, as will be explained infra. Once the contact addressor moves beyond a contact swinger, the latter returns automatically from the position to which it was flexed by an addressor 23.

Proceeding now with a detailed description of the control circuit 75 illustrated in FIG. 4 for use with a teaching machine 11 which does not have a connected test control unit 30, the circuit includes an on-off switch 77 which when operated to its closed position closes an obvious circuit for a pilot light 79 to ground indicating that the unit is in condition for operation. To assist the instructor in indexing the drum 13 for the purpose of loading the drum with the program cards or indexing the first question into proper position for viewing, an index pushbutton switch 80 is disposed behind the front panel cabinet for operation by the instructor. Momentary depression of pushbutton index switch 80 completes a circuit to the drive motor 53 which rotates drum 15 and this rotates a contact 5 from engagement with drum index control switch 81 (FIG. 4) which transfers from its open to a closed position. Closure of index control switch 81 completes a holding circuit for the motor when switch 80 is released and completes a circuit to index the drum to the next question over a circuit including lead 83, now closed drum index control switch contacts 81, lead 85, the drive motor 53 to return line 86 to ground. The motor 53 turns the drum 25 until contact 5 on drum 25 opens switch 81 and disconnects motor 53 from line 83. Index pushbutton 80, selector switches 21 in association with switches 63, 65, 67 and 69, when properly activated, override index control switch 81 and the above indexing position. Repetitive operation of the index switch 80 may be made until the program cards are all loaded or the first question is in alignment with the display window 17.

If the student makes the right choice for the answer which, in this instance, is at line B, the student will depress the selector pushbutton B. The addressor pin 23 for this question will also be in the B or secondmost, radially outward position and camming the contact swinger 61 to a position to engage a now closed contact 88 (FIG. 4) and complete a path over line 85 to energize the right light 89 and the drive motor 53 which are connected by return line 86 to ground. Thus, with the B pushbutton operated, the right light 89 and the drive motor 53 are simultaneously actuated and the drum will be automatically indexed to the next position at which another problem is displayed. However, if one of the selector pushbuttons A, C or D was operated for this same question, it would complete a path from lead 83, through its control switch contacts, and the respective swingers 61 and a contact 90 on a common lead 91 to operate a wrong light 93 and also a wrong counter 95 which are connected to the return line 86 which is grounded. Since the driving motor 53 was not operated, the student must continue to depress selector pushbuttons until he selects the proper pushbutton, namely B, associated with the correct answer. Only then will the drum 15 index to the next question. The same sequence of operation continues for each of the questions through the length of the program with each wrong answer being counted in the wrong counter 95.

When the teaching machine 11 is to be used with a test control unit 30, the latter is detachably connected by a multiple plug connector 97 to the teaching machine 11, and the control circuitry 98 is preferably of the kind illustrated in FIG. 5. As will be explained, the control circuitry 98 allows the teaching machine to be operated in either of two modes, namely, the "teaching" mode in which the program drum 15 indexes only in response to a right answer choice, or in the "testing" mode in which the drum indexes irrespective of whether the answer choice is right or wrong. When testing, each wrong answer is counted on the console of the test control unit 30 which is usually a location remote from the teaching machine 11, for example, on the teacher's desk.

To choose between the respective "teaching" or "testing" modes, a manually operable, mode selection switch 100, which may be carried on either the test control unit or the t4aching machine, is operated to the desired position. Assuming that the switch 100 is operated to the "testing" mode, it moves three contact swingers to first positions, such as illustrated in FIG. 5. Wherever possible, the same reference characters are used in FIG. 5 to indicate those elements which were previously described in connection with FIG. 4. Thus, operation of the on-off switch 77 operates the pilot light 79 and the student may begin the test. With the first question before the student, the student will choose the one of the selector pushbuttons A, B, C or D corresponding to the answer which the student thinks is right for the problem being posed. As before described in connection with the illustration of FIG. 4, the correct answer is on line B and the addressor 23 is forcing the contact swinger 61 of the control switch 65 against the contact 88. Assuming the student does select and operate the B switch, the path for operation of the drive motor 53 is as follows: from a positive lead 103; across a contact swinger 104 of an end-of-test switch 105 to a contact 106 and lead 107; through the now closed selector push button contact B; to contact swinger 61 of switch 65 and contact 88; over a lead; to the drive motor lead 111, the drive motor 53; and a common return line 113 which is connected through the now closed switch 77 to ground. Thus, the drive motor 53 is operated, but the operation of the right light 89 is precluded by the open contacts at the manually operated switch 100. However, the student will realize that the answer is correct as the wrong "light" 93 has not operated with the stepping of the drum.

If the student has selected one of the wrong answers such as an answer at line A, he would have observed operation of the wrong light 93 and wrong counter 95 which would have operated through a circuit as follows: from the lead line 103; across swinger 104 to contact 106, lead line 107, now closed, pushbutton contacts A, contact swinger 61 to lead line 117, through wrong light 93, through wrong counter 95, to the return ground line 113. Also, a parallel path for operation of the wrong counter 120 at the test control unit 30 is established from the lead 117 at the wrong light 93, through the fifth position on the connector 97, to a lead line 119, the wrong counter 120, lead 121, third contact of the connector 97, and return line 113 to ground. Thus, the wrong counter 120 would be operated to score a wrong answer. Even though a wrong answer was selected, the drive motor 53 is also operated simultaneously with operation of the wrong light 93 and wrong counters 95 and 120. Specifically, the circuit for operating the drive motor with depression of switch A is as follows from the positive lead 103, end-of-test switch swinger 106, swinger 125 of the test mode switch 100, a now closed, second set of contacts 127 of the switch A, to a lead line 129, lead 109, to the drive motor lead 111, the drive motor 53 and return line 113 to ground. Thus, the drive motor 53 is energized and the drum 15 is indexed to the next problem.

The test will continue and the stepping of the drum 15 continues with each depression of one of the selection pushbuttons A, B, C or D and the wrong counter 120 at the teacher control unit 30 keeps a running count of the wrong answers of the student. When the student has completed the test which is usually at the end of the complete revolution of the drum 15, and end-of-test pin 131 carried by the drum 15 engages and moves the swinger 104 of the end-of-test switch 105 to engage a contact 132 and complete a path for lighting the end-of-test light 135 at the teacher control unit. The swinging of the end-of-test swinger 105 from the contact 104 opened the previously described circuit for the pushbuttons A, B, C and D. Hence, operation of a selector pushbutton A, B, C or D does not result in a stepping of the drum 15.

However, the drum 15 may be automatically reset to begin another test with operation of the reset switch 139 located at the test control unit 30. Operation of this reset switch completes a circuit for energization of the drive motor 53 to index the drum over a circuit as follows: from the lead 103, through the first position in the connector switch 97, through now closed, reset switch contacts 141, through the second position of the connector switch 97, common lead 111 for the drive motor 53 and then to return lead 113 to ground. The drive motor 53 will thus drive the drum so that the end-of-test pin 131 moves past the end-of-test switch 105 whereby its swinger 104 assumes its normally closed position with the contact 106. At this time, the drum 15 is usually at the first question position. If the number of questions are relatively few and the drum is not at the first question position in response to operation of the reset switch 139, the index switch 80, illustrated in FIG. 5, may be operated to again energize the driving motor over a circuit as follows: lead line 103, end-of-test swinger 104, lead 107, now closed contacts of the drum index control switch 81, lead 111, drive motor 53 and return line 113 to ground.

Having described the testing mode of operation, the teaching mode of operation will now be described in connection with FIG. 5. When the mode switch 100 is switched to the "teaching" position, its three contact swingers move from the illustrated, solid line positions in FIG. 5. When the control circuit 98 is in the "teaching" mode, operation of a wrong choice button, such as C, will complete circuit paths for the wrong light 93 and the wrong counter 95 over a circuit lead 103, now closed contacts 143 of the mode switch 100, across lead 145, over common lead 107, through the now closed, pushbutton contacts C, through contact swinger 61 of control contacts 67, to the lead 117 and then through wrong light 93 and wrong counter 95 to the return line 113 leading to ground.

When the student makes the correct choice with operation of the pushbutton B, the driving motor 53 is operated over a circuit from the common line 107, now closed contacts B, the contact swinger 61 of switch 65, lead 109, common line 111 for the drive motor 53 and to return line 113 to ground. Simultaneously, the right light was operated over a circuit which is parallel the circuit for the drive motor 53 and which includes the common line 111, lead 149, through now closed switch contacts 151 and lead 153 through the right light 89 and return line 113 to ground. Thus, a correct choice causes stepping of the motor and operation of the right light which acts as a stimulation and a reinforcement of the right answer.

From the foregoing, it will be seen that the present invention is particularly applicable to programming by the instructor who can easily make up the cards and insert them on the program drum. While the program drum illustrated herein is a right circular cylinder, it will be appreciated that the drum may have other shapes, e.g., an elongated endless belt, and still function and fall within the purview of the present invention. The drum is easily addressed by moving addressors 23 to the proper position for the correct answer for the problem being posed. Because of the relatively simple and inexpensive arrangement, the instructional unit is of particular importance to the ordinary classroom or other usage wherein initial cost is of considerable importance. Also, preprinted programs as well as teacher prepared programs are most economical. The addition of a test control unit 30 allows the capability of testing students and automatically grading the test with the use of the teaching machine.

While a preferred embodiment has been shown and described, it will be understood that there is no intent to limit the invention by such disclosure but, rather, it is intended to cover all modifications and alternate constructions falling within the spirit and scope of the invention as defined in the appended claims.

We claim:

1. An instructional apparatus for teaching or testing students with a series of program cards having problems and a plurality of multiple choice answers thereon, said apparatus comprising a teaching machine having a support, a rotatable drum having a peripheral surface and end surfaces mounted on said support for turning about its longitudinal axis, means on said drum for releasably fastening a series of said program cards to the peripheral surface of said drum, a housing on said support for covering said drum and positionable to expose said drum for fastening said program cards thereon and having a display window for exposing the program card at a display position at which the student may view a problem and select one of the multiple choice answers therefor, motor means for sequentially indexing the drum to bring the program cards to said display position, a plurality of manually operable answer switch selectors corresponding in number to and each associated with the multiple choice answers on a card, said same plurality of manually operable answer switch selectors being useable with each of said program cards and for selecting a correct answer for a problem thereon, a set of manually settable selector switch means disposed at an end surface of said drum and associated with each program card and including selector pins settable to a position corresponding to a right answer or a wrong answer, coding means identifying each selector switch pin of each set of switch means with a multiple choice answer on an associated program card whereby the apparatus may be programmed by the user with a setting of the selector pins in accordance with right and wrong answers for each program card, an electrical control circuit in said teaching machine having means for operating in a first mode to condition said teaching machine to index said drum in response to a right answer choice but not in response to a wrong answer choice, a remote test control unit for grading the student's answer selection, electrical connecting means extending from said remote test control unit for detachably connecting the same to said teaching machine, said remote test control unit having a counter therein for grading and displaying the grade of the student's answer selection, said electrical circuit having means for operating in a second mode to cause said counter to operate in said test control unit and to cause said drum to index with each right or wrong answer choice, and switch means for causing said electrical control circuit to operate in said first mode or in said second mode.

2. An apparatus in accordance with claim 1 in which visual indicators indicate right and wrong selections on the teaching machine to the user and in which a counter for wrong or right answers is provided at said teaching machine.

3. An apparatus in accordance with claim 1 in which a series of pin receiving sockets are formed in an end surface of said drum and in which said coding identifying means includes indicia on said drum extending between a series of said pin sockets and a program card location on the peripheral surface of said drum.